United States Patent [19]

Moen

[11] Patent Number: 5,308,204
[45] Date of Patent: May 3, 1994

[54] WALL PLUG TYPE FASTENER
[76] Inventor: Lasse O. Moen, 16734 Township Meadows, Houston, Tex. 77095
[21] Appl. No.: 52,174
[22] Filed: Apr. 23, 1993
[51] Int. Cl.[5] .......................... F16B 13/04; F16B 21/00
[52] U.S. Cl. ...................................... 411/37; 411/344; 411/908; 29/522.1
[58] Field of Search ...................... 411/34, 37, 38, 340, 411/344, 908; 29/522.1, 525.1

[56] References Cited
U.S. PATENT DOCUMENTS

| | | |
|---|---|---|
| 3,651,734 | 3/1972 | McSherry . |
| 4,174,910 | 11/1979 | McSherry ...................... 402/19 |
| 4,181,061 | 1/1980 | McSherry . |
| 4,221,154 | 9/1980 | McSherry . |
| 4,462,729 | 7/1984 | Uhlig et al. .................. 411/344 X |
| 4,704,057 | 11/1987 | McSherry ...................... 411/344 X |
| 4,828,439 | 5/1989 | Giannuzzi .......................... 411/37 |
| 4,878,790 | 11/1989 | McSherry et al. ............. 411/344 X |

Primary Examiner—Neill R. Wilson
Attorney, Agent, or Firm—Donald Gunn

[57] ABSTRACT

A wall plug type fastener comprises an elongate anchor body having arm members extending radially from the anchor body. Brace members provide support for the anchor body and permit distribution of load forces applied to the anchor. Anti-rotational flanges extending along the anchor body secure the fastener against rotational displacement when installed in a drywall. The anchor body defines a first axial void in alignment with a satellite body defining a second axial void spaced from and coaxial with the anchor axial void.

19 Claims, 2 Drawing Sheets

WALL PLUG TYPE FASTENER

BACKGROUND OF THE DISCLOSURE

The present disclosure is directed to a wall plug type fastener designed to fasten objects to drywall material (normally known as sheet rock). This fastener is different in operation in that (1) the fastener will not rotate in place in the wall as a screw is engaged, (2) the fastener provides structural reinforcing braces and (3) the fastener is easily removable.

There is a well appreciated need for drywall fasteners which are strong enough to support objects to be hung, while at the same time being designed to prevent rotation in and destruction of the drywall in which they are employed. Drywall, while being employed widely as a very desirable interior wall material, does not provide sufficient support to objects that are commonly attached thereto by means of a nail or a screw. In order to circumvent problems of a nail tearing through, it has become necessary to design a fastener which can distribute the forces associated with hanging or fastened objects over a larger area which can then be more readily accommodated by the drywall. As a generalization, the fasteners presently available which address this problem have lacked structural reinforcement and have been subject to collapsing and subsequently pulling out of the wall. These available fasteners, also, cannot be easily removed. Once these fasteners have been installed, later destruction of the drywall is necessary to permit removal. Further, fasteners which rotate during extension tend to bore out a larger hole than needed to sufficiently support the weight and sustain the stresses resulting from the hung object. The cylindrical metal fasteners on the market simply do not satisfactorily accomplish these tasks. Firstly, these fasteners tend to rotate when screwing in the screw. They are constructed with the arm members radially connected to a threaded collar in a rigid state. In order to extend the arms, the screw must be tightened with enough force to fold the arm members at a point approaching its midpoint. It is this initial force that causes rotation of these particular style fasteners. Secondly, the fasteners available do not hold sufficient weight. These fasteners lack structural support to prevent collapse of the securing arm members under stress. When the screw has spread the wings of the metal fasteners, there no longer remains a support mechanism to prevent the wings from collapsing under weight. The threaded collar to which the arms are attached becomes a stress point. The perpendicular relationship established by the extended arms and threaded collar consequently restricts the strength of the fastener to that of the arm material. The metal fasteners also cannot be easily removed. Once the wings have been extended, the only reasonable approach to remove the fastener is by cutting a large hole in the drywall around the fastener. This forms a hole large enough to allow the collar to pass through the wall, and is damaging to the wall.

The fastener of the present disclosure can be readily distinguished from the structures described above. The present fastener comprises arm members that extend radially from the anchor body. On insertion, the arm members spring back from a collapsed state necessary for insertion to their normal extended position. Consequently, an initial, excessive force is not necessary to extend the arm members. Further, the present fastener utilizes braces that provide support for the fastener and also allows for distribution of the forces over a larger area. The braces form a structural support system which directs the forces exerted by the hanging object along the axis of the screw to the satellite body, down laterally directed braces to the arm members and over the surface area of the arm members. The structure further utilizes anti-rotational wings which prohibit rotation of the installed fastener in the drywall. These wings secure the fastener so that unwanted rotational displacement does not occur by cutting a notch in the drywall as the fastener is progressively inserted into the drywall. This cutting action allows the fastener to be simultaneously secured as the wings become embedded (on tightening) in the drywall. The stability achieved by the anti-rotational wings is enhanced as the remote satellite body is engaged. Further, the present fastener can be easily removed. For removal, one need only to unscrew the exposed screw, remove any bracket present and cut off the collar on the anchor body. The fastener can then be pushed through the wall and the hole covered with drywall filler. The only destruction of drywall necessary for removal is a small circular hole which is necessary for initial insertion of the fastener.

One very important feature that this plug has that others do not, is that when the screw is tightly secured it will draw the satellite body right up against the anchor body to give the wanted tension on the braces. The person turning the screw will feel that suddenly more torque is needed to turn the screw, and he will then know that the anchor is fully engaged.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
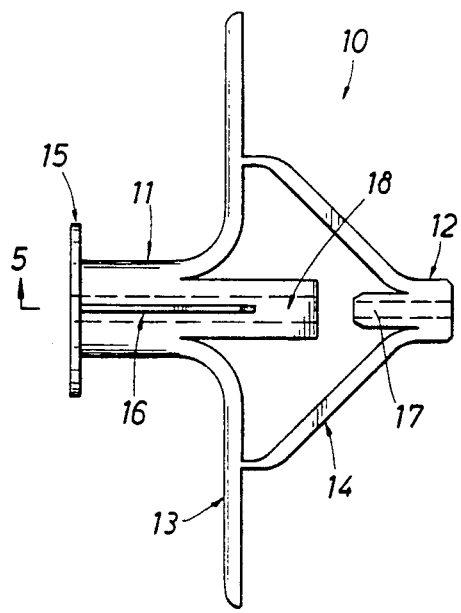
FIG. 1 is a plan view of a fastener in accordance with the present disclosure which incorporates two bodies structurally connected by way of two arm members and corresponding reinforcing braces.

Attention is first directed to FIG. 1 of the drawings where the numeral 10 identifies a fastener in accordance with the present disclosure. While many details will be set forth, one of the features of this fastener is the fact that it includes braces positioned at 45 degrees in relation to the axis of the anchor body and the arm members when the fastener is in the secured position. These braces support the extended arm members to prevent the fastener from pulling out of the drywall. This is an important feature providing for easy removal. Because this fastener is made of plastic, the flange can be easily separated from the anchor body with the use of a knife. This allows the fastener to be pushed through the wall and thus discarded when no longer needed.

Figure 8:
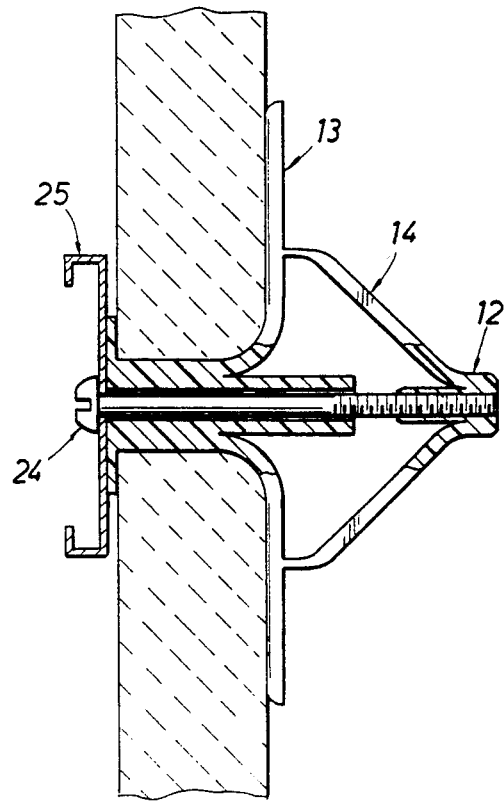
FIG. 8 is a plan view of the fastener in its extended position in the drywall including the mounted object and the screw which secures the fastener.

Briefly, the apparatus includes an elongate anchor body 11 and a spaced satellite body 12. The two bodies are connected by at least a pair of similar arm members 13 which are in turn connected to corresponding arm braces 14. The arms and braces operate symmetrically on the left and right. Additionally, the anchor body and the satellite body are relationally connected by a screw (FIG. 8).

Figure 5:
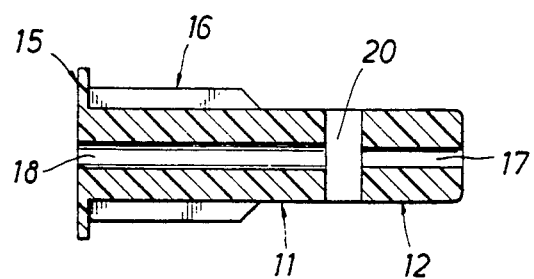
FIG. 5 is a sectional view along the line 5—5 of FIG. 1 showing details of construction of the fastener including the axial voids defined by both the anchor body and the satellite body.

Consider this construction in detail. The anchor body 11 defines an axial void 18 extending the length of the elongate body 11 and having openings at both ends of the elongate body 11. The diameter of the axial void 18 is sized slightly larger than the screw required to relationally retrieve the satellite body 12 and pull it to the body 11 (FIG. 5). The axial void of the anchor body is smooth. This allows the screw to axially slide through the void while at the same time fitting snugly. The screw must be free to rotate once the screw is inserted through the anchor body and threaded with the satellite body (see FIG. 8). The anchor body 11 has a flange 15 positioned on one end to insure proper positioning of the fastener 10 on insertion and also to prevent the fastener 10 from being pushed through the drilled hole in the drywall.

The satellite body defines a slightly smaller secondary axial void coaxial with the void of the anchor body (FIG. 5). In its preferred embodiment, a self tapping screw is threaded into a threadless satellite body. Alternatively, the satellite body can be threaded and an ordinary screw can be used to engage the sateelite body. This slightly smaller passage allows engagement of the screw into the satellite body, while at the same time the screw is able to rotate freely in the axial void of the anchor body. The screw retrieves the satellite body. As the satellite body is drawn towards the anchor body, the supporting braces are wedged into a bracing position between the arm members and the satellite body (FIG. 8). The satellite body can be drawn up against the anchor body, which will give a signal to the person that the anchor is fully engaged, since the torque will increase significantly.

Figure 6:
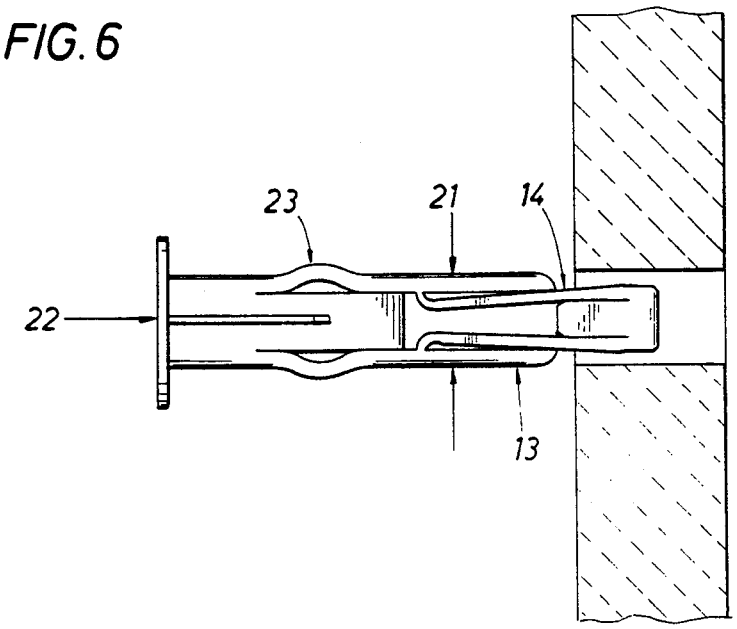
FIG. 6 is a plan view illustrating depression of the arm members at the arrows in preparation for insertion into the drywall.
Figure 7:
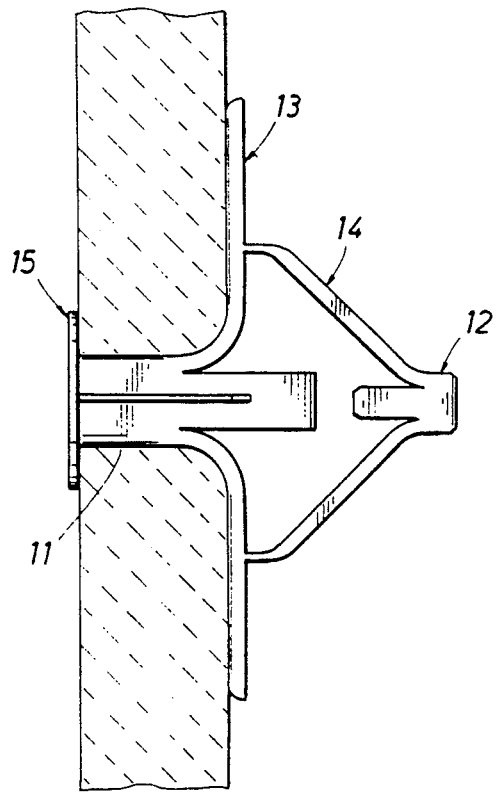
FIG. 7 is a plan view illustrating the fastener after insertion into the drywall and return of the arm members to their normal or extended position.

The first arm members 13 extend radially from the anchor body 11 while in the extended or normal position. The arm members are hinged at the connection with the anchor body (FIG. 6). The thickness of the arm members is slightly reduced at the connection point to enable hinging motion. This allows the fastener to collapse under finger pressure to the diameter of the pre-drilled hole in the drywall. On insertion of the fastener through the hole, the two arm members spring back to their normal position (FIG. 7). The arm members 13 are reinforced by and connected to the supporting braces 14. The braces in turn connect to the satellite body 12 and structurally align the arm members 13 perpendicular to the axis of both the elongate body and the satellite body 12. The preferred form of the fastener 10 has two arms at 180 degree spacing (FIG. 2); while the number can be greater, the economical form is only two arms. If more, the several arms are equally spaced. The fastener admits of embodiments with three and five members. However, logic and practicality dictate that two and four members are more reasonable.

Anti-rotational wings 16 are positioned on the outer surface of the anchor body 11 and extend from the flange 15 for a distance sufficient to prevent rotation on insertion and extension. The wings or flanges lock against rotation. The width of the wings can vary depending on the size of the fastener and the penetration depth necessary to prevent rotation.

In its preferred embodiment, the anchor body 11 is made of a thermoplastic or nylon. This material is of sufficient hardness to prevent fracture under stress. This hardness is in a range of about 30–50 durameter. Because the preferred embodiment is made of plastic or nylon, this fastener 10 is readily mass produced and relatively inexpensive. The square shape (note the dotted line in FIG. 2) provides additional resistance to rotation of the fastener as it is secured snugly into the drywall.

Consider details of construction of the preferred embodiment. This description is directed to a fastener for use in drywall having a thickness of one half inch. One half inch drywall is but one size of such material, albeit a common size of drywall material. The flange 15, circular in shape (FIG. 2), has a diameter of 9/16 inch and a thickness of 1/32 inch. The axial void 18 for receiving the screw in the center of the flange 15 is 3/16 inch in diameter. The anchor body 11 has a length of 13/16 inch and a width of 5/16 inch. The axial void 18 of the anchor body has a diameter of 3/16 inch, the anchor body 11 being otherwise solid throughout (FIG. 5). The first set of arm members 13 extend to a length of one inch from the center of the axial void 18 of the anchor body. These arm members 13 have a thickness of 1/16 inch and a width of 5/16 inch. The first set of arm members 13 are axially connected to the anchor body 11 to define a ½ inch space between the inner flange surface and its own inner surface. These arm members extend radially from the anchor body. The proximal portion of the arm members curve from their axial connection to extend radially (FIG. 1). This allows these arm members to hinge under finger pressure and spring back to a normal extended state (FIGS. 6 and 7). The second set of arm members 14 (braces) have a thickness of 1/16 inch and a width of 5/16 inch. The second set of arm members thin slightly to 1/32 inch at their connection with both the first set of arm members 13 and the satellite body 12 (FIG. 1). This decrease in thickness allows these arm members to hinge at both ends. The satellite body 12 has dimensions of ¼ inch × 5/16 inch at its terminal end where the arm members 14 connect. The satellite body 12 has a length of 5/16 inch. The axial void of the satellite body 17 is ⅛ inch in diameter. The space (when relaxed) between the anchor body 11 and the satellite body 12 is ⅛ inch. At this distance, the braces 14 form a 45 degree angle with a line perpendicular to the axis of the axial voids. The braces 14 connect to the first arm members 13 at a point ½ inch from the center axis of the axial voids.

FIG. 1 is a plan view showing the fastener in its relaxed state. The articulated arm members 13 extend radially from the anchor body 11. The braces position the satellite body 12 relative to the anchor body 11. Preferably a 45 degree angle is formed between the articulated arm members 13 and the braces 14. The anti-rotational wing 16 is seen extending along the axis of the anchor body. The flange and the articulated arm members define a space equal to the thickness of the drywall.

Figure 2:
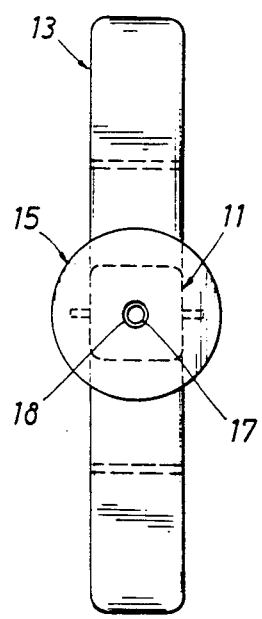
FIG. 2 is a front view of the fastener which illustrates the relationship of the flange, the anchor body, the anti-rotational wings and the arm members.

FIG. 2 shows a front view of the fastener. The alignment of the several members is shown. The arm members 13 are positioned 180 degrees from one another. Also, the size variance of the axial voids is illustrated. The axial void defined by the anchor body 18 is slightly larger than the axial void defined by the satellite body 17.

Figure 3:
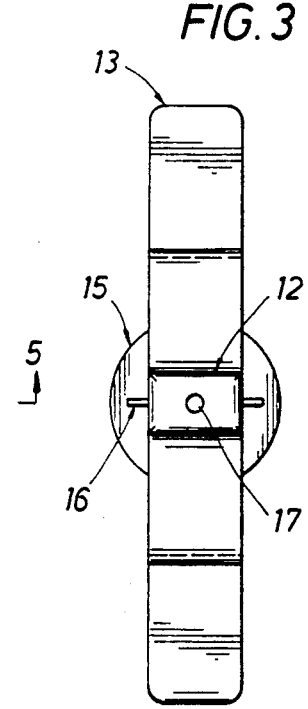
FIG. 3 is a rear view of the fastener which illustrates the relationship of the flange, the anti-rotational wings, the arm members, the braces and the satellite body.

FIG. 3 is a rear view of the fastener. The coaxial position of the satellite body 12 is shown.

Figure 4:
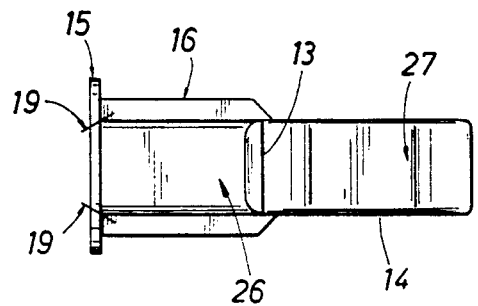
FIG. 4 is a top view of the fastener which illustrates the relationship of the flange, the anchor body, the anti-rotational wings, the arm members, the braces and the satellite body.

FIG. 4 is a top view illustrating the hinging portions of the arm members 26 and the braces 27. The material thins at these areas to provide flexibility. Flexibility is necessary to collapse the arm members and the braces in preparation for insertion. Also, flange removal is accomplished by cutting the flange at the connection with the anchor body as shown at a cut line identified by the numeral 19.

FIG. 5 is a sectional view defining the axial voids 17 and 18 of the fastener. The anchor body 11 and the satellite body 12 define a space 20, the distance of which is determined by the threading screw. The anchor body 11 and the satellite body 12 are solid throughout excepting the axial void. The flange 16 is shown radially extending from the anchor body 11.

FIG. 6 illustrates loading of the fastener. Finger pressure is exerted on the articulated arm members 13 at the arrows 21. Under pressure, the arm members hinge at their thinner curved portion 23. As the arm members are hinged, the braces also hinge at their thinner portions. The narrowing portions of the arm members and the braces allow the fastener to collapse. Once the fastener is collapsed, the fastener is inserted into the hole in the drywall in the direction of the arrow 22.

FIG. 7 shows the fastener inserted into the drywall and positioned to receive the screw. On insertion, as the arm members clear the drywall they extend back to their normal relaxed state.

FIG. 8 shows the fastener positioned in the drywall and engaged by the screw 24. The satellite body is relationally positioned by the screw to support the braces at the appropriate angle. A bracket 25 is mounted and secured by the fastener. This bracket is supported to withstand the weight of hanging objects. The bracket is one of many things that can be fastened to the drywall. Hooks for hanging pictures and any directly mountable fixtures or devices are but a few examples.

Consider now the fastener in application. In relation to FIGS. 1 and 6 of the drawings, the mode of operation will be globally described as it relates to the drywall into which it is inserted. First, the arm members are depressed to a position axially related to the anchor body allowing insertion of the collapsed fastener into a pre-drilled hole in the drywall. When the fastener is positioned such that the region 23 (FIG. 6) reaches a location just beyond the wall, the arm members begin bending out to their normal or extended positions. Once the fastener is inserted so that the flange is flush with the drywall, a screw is inserted through the object to be fastened and then through the flange end of the anchor body to the point where it engages the threaded void in the satellite body. The screw is then rotated with a screw driver to properly position the satellite body relative to the anchor body. This positioning of the satellite body determines the angle of the braces in relation to the axis of the screw necessary to provide support.

Once the fastener's usefulness is no longer desired or necessary, the flange can be separated from the anchor body using a knife (FIG. 4). The fastener is then freed to be pushed through the drywall. Drywall filler is then used to fill the hole remaining in the drywall.

While the foregoing is directed to the preferred embodiment, the scope thereof is determined by the claims which follow.

What is claimed is:

1. A wall plug type fastener, comprising:
   (a) an elongate anchor body defining an internal anchor axial void, the anchor body having first and second ends;
   (b) a wall engaging flange at the first end of the anchor body, the flange defining an exposed hole coaxial with the void;
   (c) an elongate satellite body defining a secondary axial void spaced from and coaxial with the anchor axial void, said satellite body constructed and adapted to move toward and abut said elongate anchor body to enhance alignment of the fastener;
   (d) first articulated arm members radially coupled to the anchor body at a point between the first and second ends; and
   (e) second articulated arm members coupled to the first articulated arm members and also coupled to the satellite body.

2. The fastener of claim 1 further comprising means for relationally retrieving the satellite body towards the anchor body.

3. The fastener of claim 2 wherein the first set of articulated arm members is axially connected to the anchor body, the first set of articulated arm members having a curved portion to extend radially from the anchor body.

4. The fastener of claim 3 wherein the second set of articulated arm members is connected to the first set of articulated arm members and the satellite body by hinging means.

5. The fastener of claim 1 wherein the first and second set of articulated arm members have a width equal to the width of the anchor body.

6. The fastener of claim 1 wherein the secondary axial void threads to an elongate screw through said main body.

7. The fastener of claim 1 formed of plastic.

8. The fastener of claim 1 wherein the second set of articulated arm members forms a 45 degree angle with the first set of articulated arm members.

9. The fastener of claim 1 further including means for preventing rotation of the fastener.

10. A wall fastener, comprising:
    (a) a main body defining an axial void, the main body having first and second ends;
    (b) a wall engaging seating collar flaring from the first end of the main body;

(c) securing means radially extending from the main body, said means being connected at a point between the first and second ends; and (d) braces hingedly connected between said securing means and an elongate secondary body to relationally support said securing means, the secondary body being constructed and adapted to move toward and abut the main body to enhance alignment and extension of the fastener.

11. The fastener of claim 10 further comprising a means for relationally retrieving the secondary body towards the main body.

12. The fastener of claim 11 wherein securing means is axially connected to the main body.

13. The fastener of claim 12 wherein the set of braces is connected to securing means and the secondary body so as to hinge.

14. The fastener of claim 10 wherein securing means and the set of braces have a width equal to the width of the main body.

15. The fastener of claim 10 further comprising a set of anti-rotational wings axially connected to the main body and radially extending from the main body.

16. The fastener of claim 10 wherein the secondary axial void threads to an elongate screw through said main body.

17. The fastener of claim 10 made of plastic.

18. The fastener of claim 10 wherein the second set of braces forms a 45 degree angle with an axis of the axial voids.

19. A method of efficiently fastening objects to drywall, comprising:

(a) drilling a hole through drywall;

(b) depressing a set of arm members extending radially from a wall plug fastener;

(c) inserting the wall plug fastener into the hole in the drywall;

(d) aligning an object to be fastened on the wall over the fastener;

(e) inserting a screw through the object to be fastened and into the plug; and (f) rotating the screw to threadedly engage a satellite body of the wall plug fastener, retrieve the satellite body to a position abutting an anchor body of the fastener and extend at least two braces against the drywall into an optimum strength position.

* * * * *